(12) United States Patent
Dahl

(10) Patent No.: US 10,112,806 B1
(45) Date of Patent: Oct. 30, 2018

(54) PORTABLE HOIST ARM ASSEMBLY

(71) Applicant: James R. Dahl, Mullan, ID (US)

(72) Inventor: James R. Dahl, Mullan, ID (US)

( * ) Notice: Subject to any disclaimer, the term of this patent is extended or adjusted under 35 U.S.C. 154(b) by 0 days.

(21) Appl. No.: 15/652,021

(22) Filed: Jul. 17, 2017

(51) Int. Cl.
*B66C 23/64* (2006.01)
*F16B 2/00* (2006.01)
*F16B 2/08* (2006.01)
*B66C 23/20* (2006.01)
*F16M 13/02* (2006.01)

(52) U.S. Cl.
CPC ............ *B66C 23/64* (2013.01); *B66C 23/203* (2013.01); *F16B 2/08* (2013.01); *F16M 13/02* (2013.01)

(58) Field of Classification Search
CPC ......... B66C 23/64; B66C 23/203; B66C 1/22; B66C 1/10; F16B 2/08; F16M 13/02; A47B 96/06; A47B 96/061; A47B 96/07; G09F 2007/1804
USPC .... 248/544, 235, 241, 242, 247, 250, 218.4, 248/219.1, 219.3, 219.4; 294/81.1, 81.2, 294/81.4, 81.5, 81.56, 67.1, 67.3, 67.31
See application file for complete search history.

(56) References Cited

U.S. PATENT DOCUMENTS

| 3,136,519 | A | * | 6/1964 | Spriggle | B66C 23/203 |
| | | | | | 248/230.8 |
| 3,739,964 | A | | 6/1973 | Stine | |
| 5,263,675 | A | * | 11/1993 | Roberts | A01M 31/00 |
| | | | | | 182/142 |
| 5,503,358 | A | * | 4/1996 | Lapp | E04G 3/20 |
| | | | | | 182/82 |
| 5,769,372 | A | * | 6/1998 | Klosterman | F41B 5/1446 |
| | | | | | 248/217.3 |
| 5,820,455 | A | * | 10/1998 | Breedlove | A22B 5/06 |
| | | | | | 182/133 |
| 6,062,974 | A | * | 5/2000 | Williams | A22B 5/06 |
| | | | | | 452/187 |
| D431,890 | S | | 10/2000 | Twilligear | |
| 6,186,882 | B1 | * | 2/2001 | Adams | A22B 5/06 |
| | | | | | 452/189 |
| 7,341,507 | B1 | | 3/2008 | Julian, Sr. | |
| 7,913,980 | B1 | | 3/2011 | Cipriano | |
| D718,410 | S | | 11/2014 | Woller | |
| 9,161,526 | B2 | | 10/2015 | Nipper | |
| 9,162,854 | B1 | | 10/2015 | Ridgeway | |

(Continued)

FOREIGN PATENT DOCUMENTS

WO    WO8101698    6/1981

*Primary Examiner* — Anita M King

(57) ABSTRACT

A portable hoist arm assembly for coupling to an existing vertical support includes a pair of bars, a pair of first couplers, and a pair of contractors. The bars are pivotally coupled proximate to first termini of the bars. The first couplers are configured to couple to a vertical support. Each contractor is coupled to and extends between a respective first coupler and an associated bar proximate to the first terminus. The bars are configured to be positioned so that second termini of the bars abut the vertical support. A first bar extends substantially perpendicularly from the vertical support. A second bar extends angularly and downwardly from the first bar to the vertical support. The contractors are positioned to contract to couple the bars to the vertical support. A connector is coupled to the first bar proximate to the first terminus and is configured to couple to a hoist line.

16 Claims, 4 Drawing Sheets

(56) References Cited

U.S. PATENT DOCUMENTS

2011/0049315 A1\* 3/2011 Buckbee ................ A01K 97/00
                                                        248/219.4
2011/0260127 A1   10/2011 Surgeon et al.

\* cited by examiner

PORTABLE HOIST ARM ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to hoist arm assemblies and more particularly pertains to a new hoist arm assembly for coupling to an existing vertical support.

BRIEF SUMMARY OF THE INVENTION

An embodiment of the disclosure meets the needs presented above by generally comprising a pair of bars, a pair of first couplers, and a pair of contractors. The bars are pivotally coupled proximate to first termini of the bars. The first couplers are configured to couple to a vertical support. Each contractor is coupled to and extends between a respective first coupler and an associated bar proximate to the first terminus. The bars are configured to be positioned so that second termini of the bars abut the vertical support. A first bar extends substantially perpendicularly from the vertical support. A second bar extends angularly and downwardly from the first bar to the vertical support. The contractors are positioned to contract to couple the bars to the vertical support. A connector is coupled to the first bar proximate to the first terminus and is configured to couple to a hoist line.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
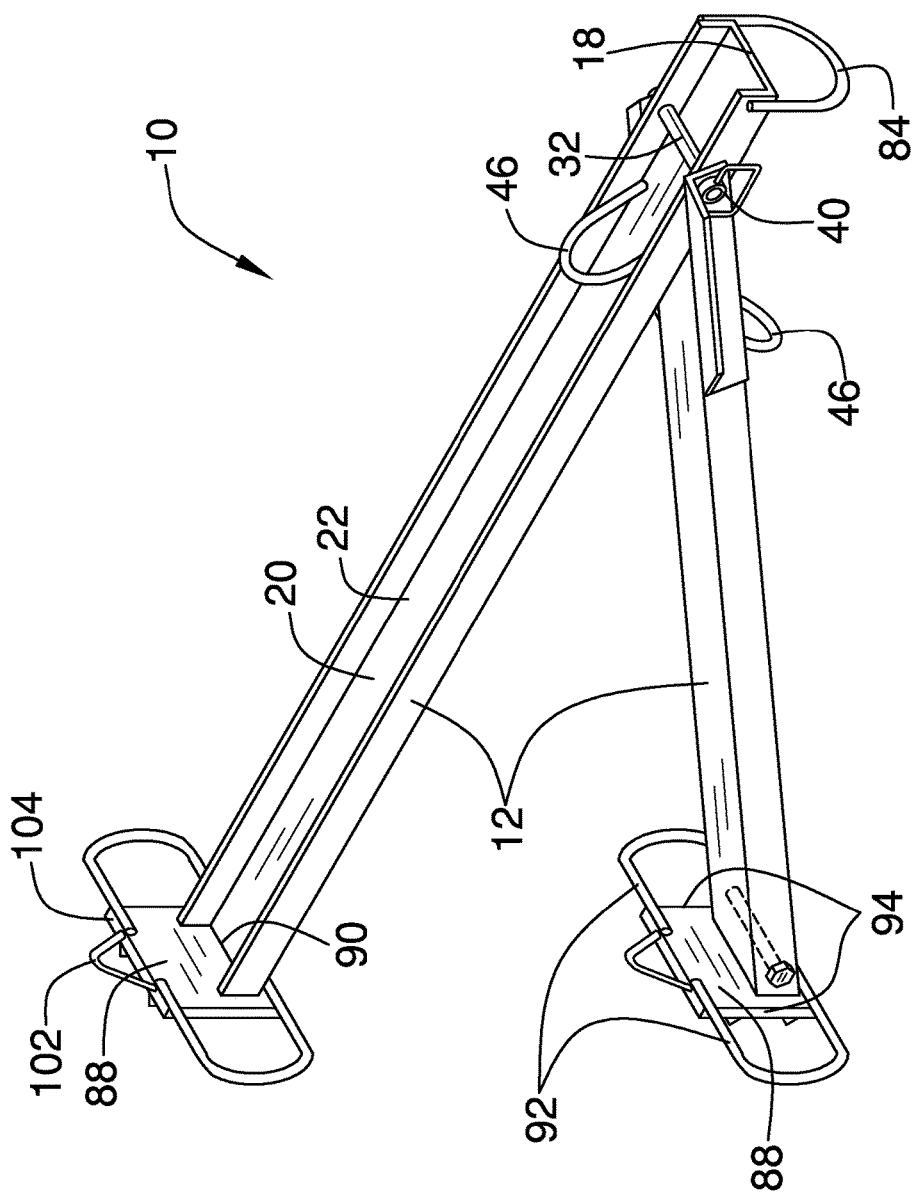
FIG. 1 is an isometric perspective view of a portable hoist arm assembly according to an embodiment of the disclosure.
Figure 2:
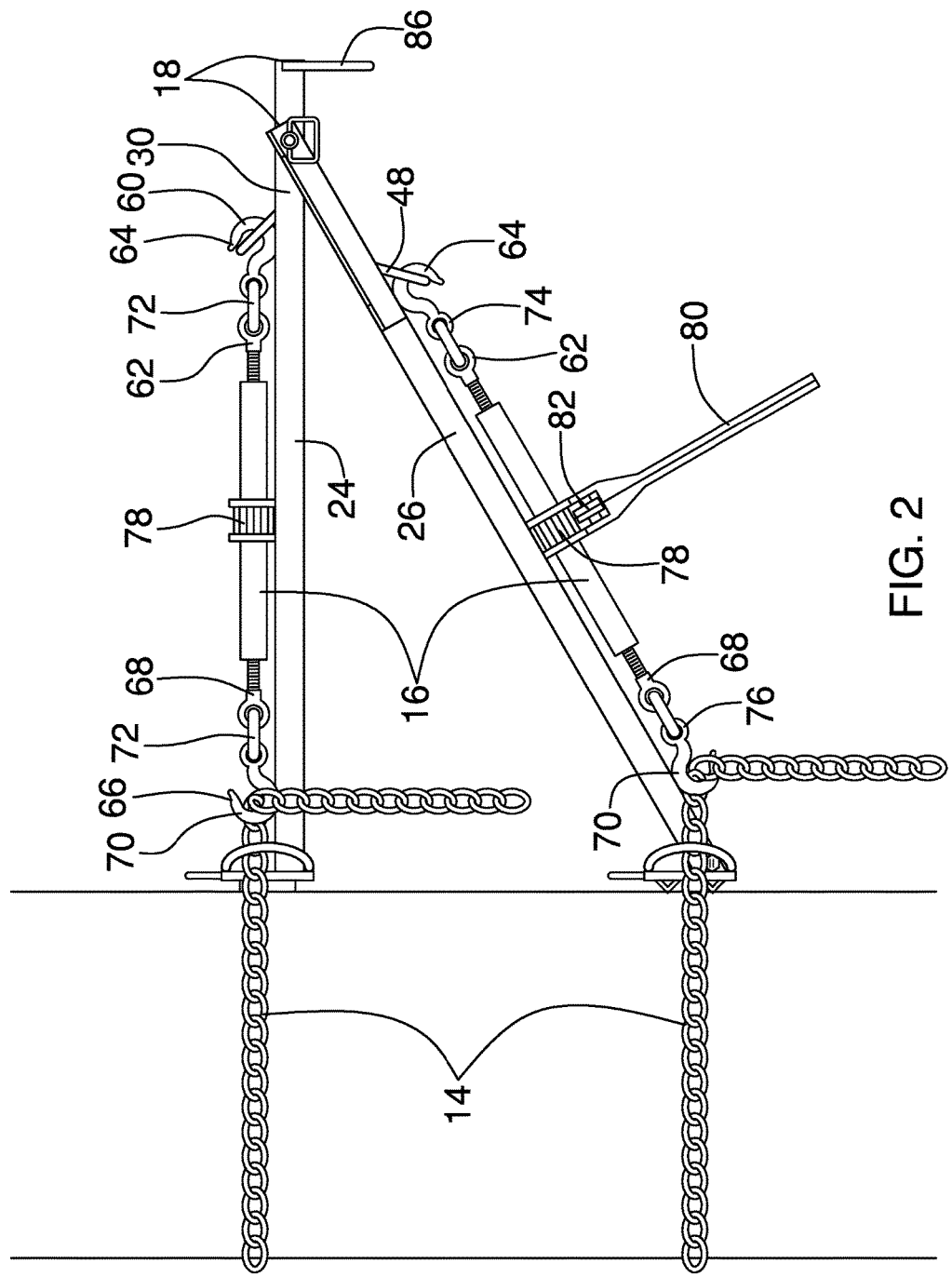
FIG. 2 is an in-use view of an embodiment of the disclosure.
Figure 3:
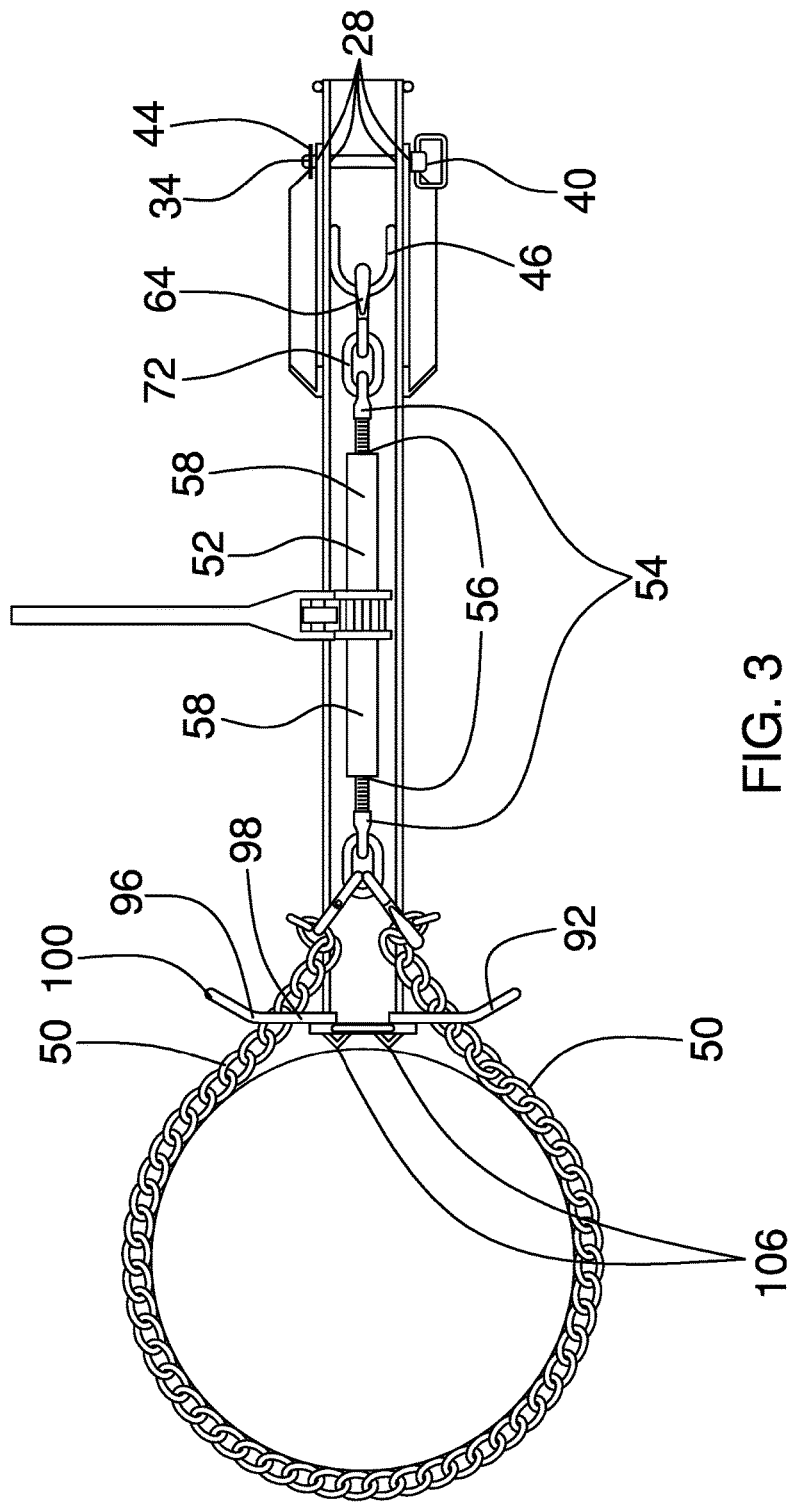
FIG. 3 is a top view of an embodiment of the disclosure.
Figure 4:
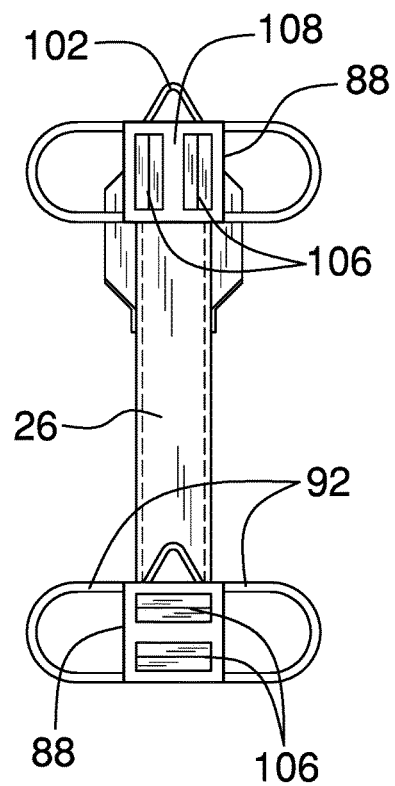
FIG. 4 is a end view of an embodiment of the disclosure.
Figure 5:
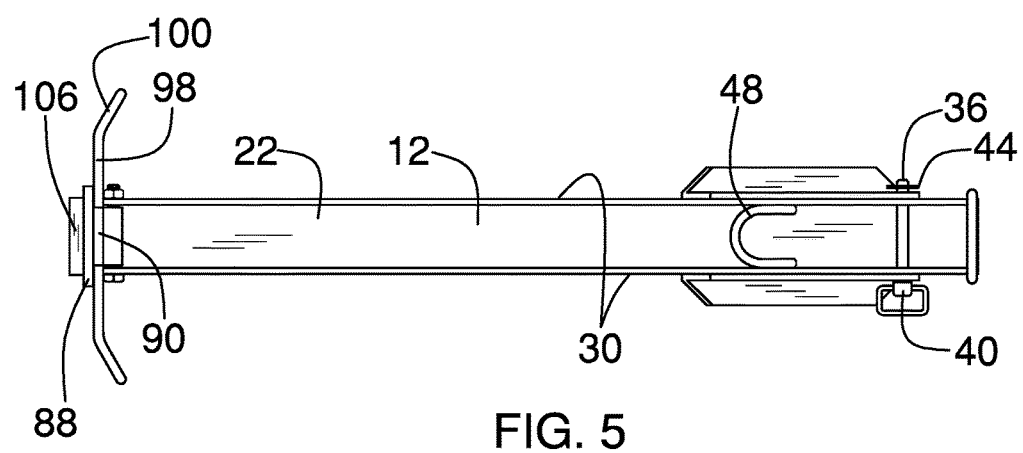
FIG. 5 is a bottom view of an embodiment of the disclosure.

With reference now to the drawings, and in particular to FIGS. 1 through 5 thereof, a new hoist arm assembly embodying the principles and concepts of an embodiment of the disclosure and generally designated by the reference numeral 10 will be described.

As best illustrated in FIGS. 1 through 5, the portable hoist arm assembly 10 generally comprises a pair of bars 12, a pair of first couplers 14, and a pair of contractors 16. Each bar 12 has a first terminus 18. The bars 12 are pivotally coupled proximate to the first termini 18. In one embodiment, the bars 12 are rectangularly box shaped. Each bar 12 has a longitudinal face 20 that is open to defines a channel 22. The pair of bars 12 comprises a first bar 24 and a second bar 26. The first bar 24 is complementary to the channel 22 of the second bar 26.

In one embodiment, each of a set of four holes 28 is positioned in an opposing side 30 of a respective bar 12. The holes 28 are alignably positioned. A pin 32 that is complementary to the holes 28 is positioned to be inserted through the holes 28 to mutually couple the bars 12. In another embodiment, an orifice 34 is positioned through the pin 32 proximate to an endpoint 36 of the pin 32. A head 40 is coupled to the pin 32 distal from the endpoint 36. The head 40 is dimensionally larger than the holes 28. The head 40 is positioned to abut the opposing side 30 of the respective bar 12 when the pin 32 is inserted into the set of four holes 28. A clip 44 that is complementary to the orifice 34 is positioned to be inserted through the orifice 34 to fixedly position the pin 32 within the set of four holes 28 to mutually couple the bars 12.

Each of a pair of first fasteners 46 is coupled to a respective bar 12. The first fastener 46 is positioned within the channel 22 proximate to the first terminus 18. In one embodiment, each first fastener 46 comprises a first ring 48. The first ring 48 is U-shaped.

Each first coupler 14 is configured to couple to a vertical support, such as a utility pole. In one embodiment, each first coupler 14 comprises a chain 50. Each contractor 16 is coupled to and extends between a respective first coupler 14 and an associated bar 12 proximate to the first terminus 18.

In one embodiment, each contractor 16 comprises a rod 52 and a pair of eye bolts 54. The rod 52 has opposing ends 56. Each of a pair of penetrations 58 extends into the rod 52 from a respective opposing end 56. The penetrations 58 are opposingly threaded. The eye bolts 54 are opposingly threaded so that each eye bolt 54 is complementary to an associated penetration 58. The penetrations 58 are positioned to threadedly insert the eye bolts 54 so that the eye bolts 54 are coupled to the rod 52.

A second fastener 60 is coupled to a first eye bolt 62 distal from the rod 52. The second fastener 60 is complementary to the first fastener 46. The second fastener 60 is positioned to couple to a respective first fastener 46 to couple the contractor 16 to a respective bar 12. In one embodiment, the second fastener 60 comprises a second hook 64. The second hook 64 is positioned to couple to the respective first fastener 46 to couple the contractor 16 to the respective bar 12.

At least one third fastener 66 is coupled to a second eye bolt 68 distal from the rod 52. The at least one third fastener 66 is complementary to the first couplers 14. The at least one third fastener 66 is positioned to couple to a respective first coupler 14. In one embodiment, each of the at least one third fasteners 66 comprises at least one third hook 70. The at least one third hook 70 is positioned to couple to a respective chain 50 to couple the respective chain 50 to the rod 52.

In one embodiment, the assembly 10 comprises a plurality of fourth rings 72, each second hook 64 comprises a second ring 74, and the at least one third hook 70 comprises a third ring 76. One fourth ring 72 is coupled to and extends between the second ring 74 and the first eye bolt 62. Fourth rings 72 are coupled singly to and extend between the third rings 76 and the second eye bolt 68.

The assembly 10 comprises a second coupler 78 and a wrench 80. The second coupler 78 is coupled to the rod 52 equally distant from the opposing ends 56 of the rod 52. The wrench 80 comprises a third coupler 82 that is complementary to the second coupler 78. The third coupler 82 is positioned to couple to the second coupler 78 to couple the wrench 80 to the rod 52. The wrench 80 is positioned to rotate the rod 52 to opposingly motivate the eye bolts 54 to reversibly couple the bars 12 to the vertical support.

A connector 84 is coupled to the first bar 24 proximate to the first terminus 18. The connector 84 is configured to couple to a hoist line. In one embodiment, the connector 84 extends perpendicularly from the first bar 24. In another embodiment, the connector 84 comprises a fifth ring 86. The fifth ring 86 is U-shaped.

Each of a pair of plates 88 is coupled to a second terminus 90 of a respective bar 12. The plate 88 that is positioned on the second bar 26 is hingedly coupled to the second bar 26.

In one embodiment, each plate 88 comprises a pair of sixth rings 92. The sixth rings 92 are U-shaped. Each sixth ring 92 is coupled to and extends coplanarly from a respective opposing edge 94 of the plate. The sixth rings 92 are positioned to insert a respective chain 50. In another embodiment, each sixth ring 92 is angled proximate to a midpoint 96 of the sixth ring 92 so that a first section 98 of the sixth ring 92 extends coplanarly with the plate 88 and a second section 100 extends transversely from the first section 98.

In yet another embodiment, each plate 88 comprises a seventh ring 102 that is coupled to and extends coplanarly from a top edge 104 of the plate 88. The seventh ring 102 is V-shaped and is positioned equally distant from the opposing edges 94 of the plate 88.

In still yet another embodiment, each plate 88 comprises a pair of protrusions 106 that is coupled to and extends from a front 108 of the plate 88. The protrusions 106 are V-shaped. The protrusions 106 are configured to stabilize the plate 88 relative to the vertical support. In still yet another embodiment, the pair of protrusions 106 that is coupled the plate 88 that is coupled to the first bar 24 extends vertically. In this embodiment, the pair of protrusions 106 that is coupled to the plate 88 that is coupled to the second bar 26 extends horizontally.

In use, the bars 12 are configured to be positioned so that the plates 88 are positioned to abut the vertical support. The first bar 24 extends substantially perpendicularly from the vertical support. The second bar 26 extends angularly and downwardly from the first bar 24 to the vertical support. The second hooks 64 that are positioned on the first eye bolts 62 are positioned to couple to the first rings 48 to couple the contractors 16 to a bars 12. The at least one third fastener 66 that is positioned on the second eye bolt 68 is positioned to couple to a respective chain 50. The third coupler 82 that is positioned on the wrench 80 is positioned to couple to the second coupler 78 to couple the wrench 80 to the rod 52. The wrench 80 is positioned to rotate the rod 52 to opposingly motivate the eye bolts 54 to reversibly couple the bars 12 to the vertical support. The fifth ring 86 that is positioned on the first bar 24 is configured to couple to the hoist line.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable hoist arm assembly comprising:
    a pair of bars, each said bar having a first terminus, said bars being pivotally coupled proximate to said first termini;
    a pair of first couplers configured for coupling to a vertical support;
    a pair of contractors, each said contractor being coupled to and extending between a respective said first coupler and an associated said bar proximate to said first terminus;
    a connector coupled to a respective said bar proximate to said first terminus, said connector being configured for coupling to a hoist line, wherein said connector is positioned on said respective said bar such that said connector is configured for coupling to the hoist line; and
    wherein said bars are configured for positioning such that second termini of said bars are positioned for abutting the vertical support with a first said bar extending substantially perpendicularly from the vertical support and a second said bar extending angularly and downwardly from said first said bar to the vertical support, wherein said contractors are positioned on said bars such that said contractors are positioned for contracting for coupling said bars to the vertical support positioning said connector for coupling to the hoist line.

2. The assembly of claim 1, further including said bars being rectangularly box shaped, each said bar having a longitudinal face, said longitudinal face being open defining a channel, said first said bar being complementary to said channel of said second said bar.

3. The assembly of claim 2, further comprising:
a set of four holes, each said hole being positioned in an opposing side of a respective said bar such that said holes are alignably positioned;
a pin complementary to said holes; and
wherein said holes are positioned in said bars such that said holes are positioned for inserting said pin for mutually coupling said bars.

4. The assembly of claim 3, further comprising:
an orifice positioned through said pin proximate to an endpoint of said pin;
a head coupled to said pin distal from said endpoint, said head being dimensionally larger than said holes;
a clip complementary to said orifice; and
wherein said head is positioned on said pin such that said head is positioned for abutting said opposing side of said respective said bar when said pin is inserted into said set of four holes, wherein said orifice is positioned through said pin such that said orifice is positioned for inserting said clip for fixedly positioning said pin within said set of four holes for mutually coupling said bars.

5. The assembly of claim 2, further including a pair of first fasteners, each said first fastener being coupled to a respective said bar such that said first fastener is positioned within said channel proximate to said first terminus.

6. The assembly of claim 2, further including each said contractor comprising:
a rod having opposing ends;
a pair of penetrations, each said penetration extending into said rod from a respective opposing end, said penetrations being opposingly threaded;
a pair of eye bolts, said eye bolts being opposingly threaded such that each said eye bolt is complementary to an associated said penetration;
a second fastener coupled to a first said eye bolt distal from said rod, said second fastener being complementary to said first fastener;
at least one third fastener coupled to a second said eye bolt distal from said rod, said at least one third fastener being complementary to said first couplers;
a second coupler coupled to said rod, said second coupler being positioned equally distant from said opposing ends of said rod;
a wrench comprising a third coupler, said third coupler being complementary to said second coupler; and
wherein said penetrations are positioned in said rod such that said penetrations are positioned for threadedly inserting said eye bolts such that said eye bolts are coupled to said rod, wherein said second fastener is positioned on said first said eye bolt such that said second fastener is positioned for coupling to a respective said first fastener for coupling said contractor to a respective said bar, wherein said at least one third fastener is positioned on said second said eye bolt such that said at least one third fastener is positioned for coupling to a respective said first coupler, wherein said third coupler is positioned on said wrench such that said third coupler is positioned for coupling to said second coupler for coupling said wrench to said rod, wherein said wrench is positioned for rotating said rod for opposingly motivating said eye bolts for reversibly coupling said bars to the vertical support.

7. The assembly of claim 6, further comprising:
each said first coupler comprising a chain;
each said first fastener comprising a first ring, said first ring being U-shaped;
said second fastener comprising a second hook;
said at least one third fastener comprising at least one third hook; and
wherein said second hook is positioned on said first said eye bolt such that said second hook is positioned for coupling to said first ring for coupling said contractor to said respective said bar, wherein said at least one third hook is positioned on said second said eye bolts such that said at least one third hook is positioned for coupling to a respective said chain for coupling said respective said chain to said rod.

8. The assembly of claim 7, further comprising:
each said second hook comprising a second ring;
each said third hook comprising a third ring; and
a plurality of fourth rings, one said fourth ring being coupled to and extending between said second ring and said first said eye bolt, two said fourth rings being coupled singly to and extending between each third ring and said second said eye bolt.

9. The assembly of claim 1, further including said connector extending perpendicularly from said respective said bar, said connector comprising a fifth ring, said fifth ring being U-shaped.

10. The assembly of claim 1, further including a pair of plates, each said plate being coupled to said second terminus of a respective said bar, said plate positioned on said second said bar being hingedly coupled to said second said bar.

11. The assembly of claim 10, further including each said plate comprising a pair of sixth rings, said sixth rings being U-shaped, each said sixth ring being coupled to and extending coplanarly from a respective opposing edge of said plate, wherein said sixth rings are positioned on said plate such that said sixth rings are positioned for inserting a respective said chain.

12. The assembly of claim 11, further including each said sixth ring being angled proximate to a midpoint of said sixth ring such that a first section of said sixth ring extends coplanarly with said plate and a second section extends transversely from said first section.

13. The assembly of claim 10, further including each said plate comprising a seventh ring coupled to and extending coplanarly from a top edge of said plate, said seventh ring being V-shaped, said seventh ring being positioned equally distant from said opposing edges of said plate.

14. The assembly of claim 10, further including each said plate comprising a pair of protrusions coupled to and extending from a front of said plate, said protrusions being V-shaped, wherein said protrusions are positioned on said plates such that said protrusions are configured for stabilizing said plate relative to the vertical support.

15. The assembly of claim 14, further including said plate coupled to said first said bar having said pair of protrusions extending vertically, said plate coupled to said second said bar having said pair of protrusions extending horizontally.

16. A portable hoist arm assembly comprising:
a pair of bars, each said bar having a first terminus, said bars being pivotally coupled proximate to said first termini, said bars being rectangularly box shaped, each said bar having a longitudinal face, said longitudinal face being open defining a channel, said pair of bars comprising a first said bar and a second said bar, said first said bar being complementary to said channel of said second said bar;

a set of four holes, each said hole being positioned in an opposing side of a respective said bar such that said holes are alignably positioned;

a pin complementary to said holes, wherein said holes are positioned in said bars such that said holes are positioned for inserting said pin for mutually coupling said bars;

an orifice positioned through said pin proximate to an endpoint of said pin;

a head coupled to said pin distal from said endpoint, said head being dimensionally larger than said holes, wherein said head is positioned on said pin such that said head is positioned for abutting said opposing side of said respective said bar when said pin is inserted into said set of four holes;

a clip complementary to said orifice, wherein said orifice is positioned through said pin such that said orifice is positioned for inserting said clip for fixedly positioning said pin within said set of four holes for mutually coupling said bars;

a pair of first fasteners, each said first fastener being coupled to a respective said bar such that said first fastener is positioned within said channel proximate to said first terminus, each said first fastener comprising a first ring, said first ring being U-shaped;

a pair of first couplers configured for coupling to a vertical support, each said first coupler comprising a chain;

a pair of contractors, each said contractor being coupled to and extending between a respective said first coupler and an associated said bar proximate to said first terminus, each said contractor comprising:
  a rod having opposing ends,
  a pair of penetrations, each said penetration extending into said rod from a respective opposing end, said penetrations being opposingly threaded,
  a pair of eye bolts, said eye bolts being opposingly threaded such that each said eye bolt is complementary to an associated said penetration, wherein said penetrations are positioned in said rod such that said penetrations are positioned for threadedly inserting said eye bolts such that said eye bolts are coupled to said rod,
  a second fastener coupled to a first said eye bolt distal from said rod, said second fastener being complementary to said first fastener, wherein said second fastener is positioned on said first said eye bolt such that said second fastener is positioned for coupling to a respective said first fastener for coupling said contractor to a respective said bar, said second fastener comprising a second hook, wherein said second hook is positioned on said first said eye bolt such that said second hook is positioned for coupling to said respective said first fastener for coupling said contractor to said respective said bar, each said second hook comprising a second ring,
  at least one third fastener coupled to a second said eye bolt distal from said rod, said at least one third fastener being complementary to said first couplers, wherein said at least one third fastener is positioned on said second said eye bolt such that said at least one third fastener is positioned for coupling to a respective said first coupler, said at least one third fastener comprising at least one third hook, wherein at least one third hook is positioned on said second said eye bolts such that said at least one third hook is positioned for coupling to a respective said chain for coupling said chain to said rod, each of said at least one third hook comprising a third ring,
  a plurality of fourth rings, one said fourth ring being coupled to and extending between said second ring and said first said eye bolt, two said fourth rings being coupled singly to and extending between each said third ring and said second said eye bolt,
  a second coupler coupled to said rod, said second coupler being positioned equally distant from said opposing ends of said rod, and
  a wrench comprising a third coupler, said third coupler being complementary to said second coupler, wherein said third coupler is positioned on said wrench such that said third coupler is positioned for coupling to said second coupler for coupling said wrench to said rod, wherein said wrench is positioned for rotating said rod for opposingly motivating said eye bolts for reversibly coupling said bars to the vertical support;

a connector coupled to a respective said bar proximate to said first terminus, said connector being configured for coupling to a hoist line, wherein said connector is positioned on said respective said bar such that said connector is configured for coupling to the hoist line, said connector extending perpendicularly from said respective said bar, said connector comprising a fifth ring, said fifth ring being U-shaped;

a pair of plates, each said plate being coupled to said second terminus of a respective said bar, said plate positioned on said second said bar being hingedly coupled to said second said bar;

each said plate comprising a pair of sixth rings, said sixth rings being U-shaped, each said sixth ring being coupled to and extending coplanarly from a respective opposing edge of said plate, wherein said sixth rings are positioned on said plate such that said sixth rings are positioned for inserting a respective said chain, each said sixth ring being angled proximate to a midpoint of said sixth ring such that a first section of said sixth ring extends coplanarly with said plate and a second section extends transversely from said first section;

each said plate comprising a seventh ring coupled to and extending coplanarly from a top edge of said plate, said seventh ring being V-shaped, said seventh ring being positioned equally distant from said opposing edges of said plate;

each said plate comprising a pair of protrusions coupled to and extending from a front of said plate, said protrusions being V-shaped, wherein said protrusions are positioned on said plates such that said protrusions are configured for stabilizing said plate relative to the vertical support, said plate coupled to said first said bar having said pair of protrusions extending vertically, said plate coupled to said second said bar having said pair of protrusions extending horizontally; and wherein said bars are configured for positioning such that said plates are positioned for abutting the vertical support with said first said bar extending substantially perpendicularly from the vertical support and said second said bar extending angularly and downwardly from said first said bar to the vertical support, wherein said second hook is positioned on said first said eye bolt such that said second hook is positioned for coupling to a respective said first ring for coupling said contractor to a respective said bar, wherein said at least one third fastener is positioned on said second said eye bolt such that said at least one third fastener is positioned for coupling to a respective said chain, wherein said third coupler is positioned on said wrench such that said third coupler is positioned for coupling to said second coupler for coupling said wrench to said rod, wherein said wrench is positioned for rotating said rod for opposingly motivating said eye bolts for reversibly coupling said bars to the vertical support positioning said fifth ring for coupling to the hoist line.

\* \* \* \* \*